S. R. BERGMAN.
DYNAMO ELECTRIC MACHINE.
APPLICATION FILED NOV. 28, 1914.
1,221,657.
Patented Apr. 3, 1917.
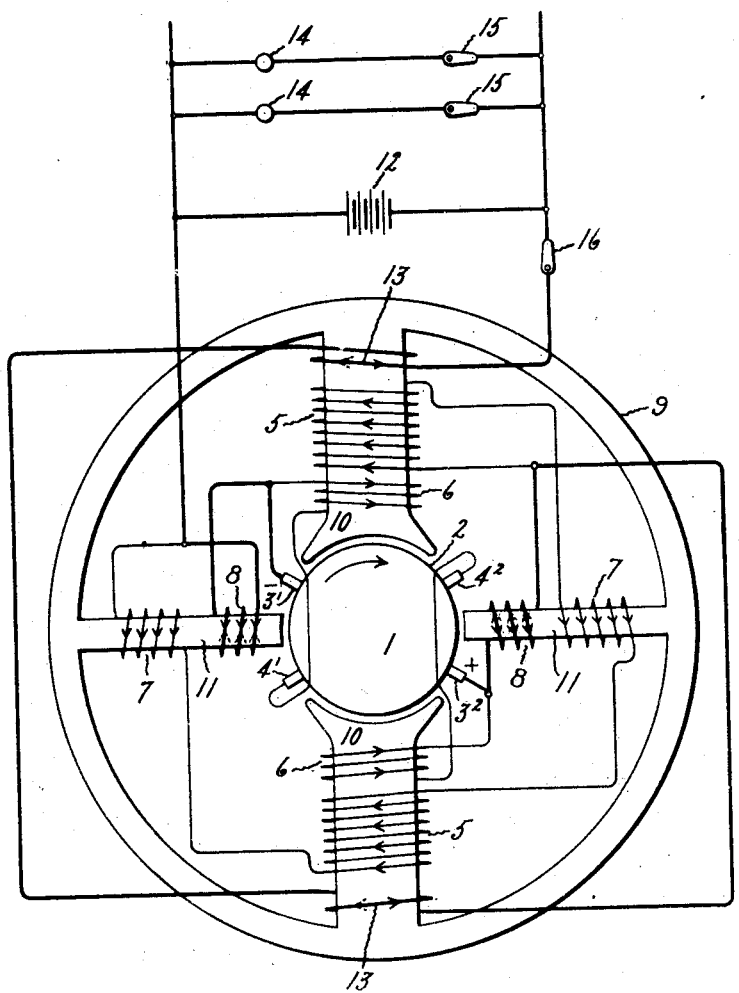
Witnesses:
Inventor:
Sven R. Bergman.
by
His Attorney.

UNITED STATES PATENT OFFICE.

SVEN R. BERGMAN, OF LYNN, MASSACHUSETTS, ASSIGNOR TO GENERAL ELECTRIC COMPANY, A CORPORATION OF NEW YORK.

DYNAMO-ELECTRIC MACHINE.

1,221,657.   Specification of Letters Patent.   Patented Apr. 3, 1917.

Application filed November 28, 1914. Serial No. 874,407.

*To all whom it may concern:*

Be it known that I, SVEN R. BERGMAN, a subject of the King of Sweden, residing at Lynn, county of Essex, State of Massachusetts, have invented certain new and useful Improvements in Dynamo-Electric Machines, of which the following is a specification.

My invention relates to dynamo electric machines and particularly to such machines which operate at variable speeds as those employed in electric lighting systems of railway trains, motor vehicles and the like, where the machine is driven from the axle or motor.

My invention has for its object to provide a novel arrangement of parts whereby the machine is inherently self-regulating and will maintain substantially constant voltage over a wide range of speed and is also capable of being operated as a motor to start a gas engine when it is used in a lighting system for a motor vehicle or the like.

The various features of novelty which characterize my invention are pointed out with particularity in the claims annexed to and forming a part of this specification. For a better understanding of my invention, reference may be had to the following description taken in connection with the accompanying drawing, in which the single figure shows diagrammatically one embodiment of my invention.

Referring to the drawing, 1 is the armature of my dynamo electric machine having a commutator 2 on which load brushes $3^1$, $3^2$ and auxiliary brushes $4^1$ $4^2$ bear. A voltage is produced between the load brushes by the revolution of the armature 1 in a field produced by a main field winding 5, and an opposing auxiliary field winding 6, the latter winding being supplied with current proportional to the speed of the armature. The auxiliary field winding 6 is connected between the load and auxiliary brushes between which a voltage is produced by a second auxiliary field winding 7. This winding 7 is supplied with substantially constant excitation, as will hereinafter appear. A field winding 8 connected in series with the load brushes is also provided for opposing the armature reactions. The machine has a magnetic field structure 9 preferably provided with main field poles 10 on which the main field winding 5 and the auxiliary field winding 6 are mounted, and auxiliary field poles 11 on which the auxiliary field winding 7 and the commutating field winding 8 are mounted.

I have shown my dynamo electric machine connected in parallel with a storage battery 12, and as the field windings 5 and 7 are connected across the storage battery, they are supplied with substantially constant excitation. Lights 14 are shown as being connected across the storage battery and generator in parallel.

The operation of my dynamo electric machine is as follows: The commutating field winding 8 produces a flux substantially equal to but in the opposite direction to that produced by the armature reaction in line with the auxiliary poles 11 and consequently neither the commutating field windings 8 or the armature reaction have any effect upon the voltage produced between the auxiliary and the load brushes. The coils 7 are supplied with substantially constant excitation and produce a substantially constant flux in line with the auxiliary poles which is cut by the armature conductors located between the brushes $4^1$ and $3^1$ and $4^2$ and $3^2$, respectively. The revolution of the armature produces a voltage between these brushes which is directly proportional to the speed of the armature, and consequently the current supplied and the bucking effect produced by the auxiliary field winding 6 is directly proportional to the speed of the armature 1. It will therefore be seen that the flux produced in the main field poles 10 decreases with an increase in the speed of the armature because the field winding 5 is substantially constantly excited from the storage battery 12. This flux produces a voltage in the armature between the main brushes $3^1$ and $3^2$ which is substantially constant over a wide range of speed. I have shown the auxiliary windings 7 so arranged as to produce a voltage in the armature coils connected between the auxiliary brushes $4^1$, $4^2$ and the load brushes $3^1$, $3^2$ in the same direction as would be produced by over-exciting the commutating field coils, that is, the potential of, say negative brush $3^1$ is positive with respect to auxiliary brush $4^1$ and auxiliary brush $4^2$ is positive with respect to positive brush $3^2$ with the direction of rotation indicated.

If it is desired to use my machine as a generator and also as a motor for starting a motor such as a gas engine on a motor vehicle, the main field poles 10 may be provided with a series field winding 13, which will give the machine a large starting torque as a motor. Since during motor operation, the amount of current taken from the battery is large compared with the amount which the generator is called upon for charging the storage battery and lighting the lights 14, the series winding 13 will have no appreciable effect on the regulation of the machine as a generator and the slight effect, which it will have, will be in a direction to assist the regulation of the machine as a generator. The series commutating field coils 8 will oppose the motor armature reaction without any change in their connections, since the current in them is reversed as is also the armature reaction.

I have indicated by arrows the flow of current in the field windings of the machine for the particular direction of rotation of the armature and of the windings indicated. The solid arrows indicate the direction of flow for generator operation and the dotted arrows the direction of flow for motor operation.

Switches 15 are shown for disconnecting the lights 14 and a switch 16 for disconnecting the machine from the storage battery when desired, as when the driving means for the armature 1 is stopped. When such a machine is installed on a motor vehicle, the switch 16 may be operated by the emergency brake, in which case, the machine will be disconnected from the storage battery whenever the vehicle is brought to rest and the emergency brake applied.

What I claim as new and desire to secure by Letters Patent of the United States, is:—

1. In a variable speed dynamo electric machine, an armature provided with a commutator, load and auxiliary brushes bearing on said commutator, a main field winding adapted to be supplied with substantially constant excitation, an auxiliary field winding opposing said main field winding and connected between said auxiliary and said load brushes, a field winding connected in series with said armature for opposing the armature reaction, and a second auxiliary field winding adapted to be supplied with substantially constant excitation for producing a field for the armature conductors located between said auxiliary and said load brushes.

2. In a variable speed dynamo electric machine, an armature provided with a commutator, load and auxiliary brushes bearing on said commutator, main field poles, auxiliary field poles, a main field winding on said main field poles adapted to be supplied with substantially constant excitation, an auxiliary field winding on said main field poles opposing said main field winding and connected between said auxiliary and said load brushes, a commutating field winding on said auxiliary field poles connected in series with said armature for opposing the armature reaction, and an auxiliary field winding on said auxiliary field poles adapted to be supplied with substantially constant excitation for producing a field for the armature conductors located between said auxiliary and said load brushes.

3. In combination, a storage battery, a dynamo-electric machine adapted to operate both as a motor from said storage battery and a generator to charge the same, said dynamo electric machine comprising an armature provided with a commutator, load and auxiliary brushes bearing on said commutator, main field poles, auxiliary field poles, a main field winding on said main field poles connected to said storage battery, a series field winding on said main field poles connected in series with said armature and so as to assist said main field winding when said machine operates as a motor, an auxiliary field winding on said main field poles opposing said main field winding connected between said auxiliary and said main brushes, a commutating field winding on said auxiliary field poles connected in series with said armature for opposing the armature reaction, and an auxiliary field winding on said auxiliary field poles connected to said storage battery for producing a field for the armature conductors located between said auxiliary and said load brushes.

In witness whereof, I have hereunto set my hand this twenty-fourth day of November, 1914.

SVEN R. BERGMAN.

Witnesses:
JOHN A. MCMANUS, Jr.,
ALBERT S. CROCKETT.

Copies of this patent may be obtained for five cents each, by addressing the "Commissioner of Patents, Washington, D. C."